United States Patent Office 3,556,928
Patented Jan. 19, 1971

3,556,928
COPPER-CLAD PLASTIC PANEL

Fred U. Zolg, Cincinnati, Ohio, assignor to Cincinnati Milacron Inc., Cincinnati, Ohio No Drawing. Continuation-in-part of application Ser. No. 644,790, June 9, 1967. This application Mar. 5, 1968, Ser. No. 710,667
Int. Cl. H05k *1/00*; B32b *15/08*
U.S. Cl. 161—186 17 Claims

ABSTRACT OF THE DISCLOSURE

Copper-clad plastic panels having plastic bases molded from a polyester/methyl methacrylate molding composition and having increased insulation resistance are disclosed. The improvement is achieved by incorporating a minor amount of an epoxide in the molding composition. The useful epoxides have at least one epoxide group for each 950 units of molecular weight, neither carbon atom of the epoxy group is connected to more than two other carbon atoms, and the epoxy groups are separated by one or more carbon atoms from any aromatic ring structure that may be present in the epoxide.

This application is a continuation-in-part of my copending application Ser. No. 644,790 filed June 9, 1967 and now abandoned.

This invention relates generally to the field of printed circuitry and more particularly to an improved copper-clad plastic laminate for use in the manufacture of printed circuits.

Laminated panels for the manufacture of printed circuits are commonly made by coating a copper foil with a layer of adhesive and then laminating a resin-impregnated sheet to the adhesive layer to produce a resinous base to which the copper is adherent. The sheet that is impregnated may be paper or glass fibers in the form of a mat or cloth. Phenolic and epoxy resins have been commonly used as impregnating resins.

While such laminated panels have been extensively used in the manufacture of printed circuits, it is generally recognized that they are subject to a number of disadvantages. One group of these disadvantages arises out of the fact that in the course of manufacture of printed circuits the laminate is brought into contact with a molten soldering bath at a temperature of the order of 500° F. and the consequent heating of the laminated panel causes certain difficulties. For example, this heating of the panel may induce vaporization of residual solvent in the adhesive layer and cause the copper cladding to blister. Heating of the panel may tend to cause degradation of the polymer and loss of mechanical strength. Also if the temperature coefficient of expansion of the resin is higher than that of copper, the panel tends to warp when subjected to the heat of the soldering bath. Another disadvantage of the prior laminates is that the adhesion of the copper to the base laminate often varies considerably. It is important that the panel have both a high order of adhesion between the copper foil and the resinous base, and a high degree of uniformity of adhesion, particularly in circuits in which the printed wiring is 0.1 inch or thinner in width.

In U.S. Pat. 3,149,021 a copper-clad panel is disclosed which overcomes these difficulties. In accordance with the disclosure of this patent, the resinous base of the panel is made by polymerizing a mixture of an unsaturated alkyd or polyester and methyl methacrylate. The problems arising out of the use of an adhesive are eliminated by molding the resinous base directly to the copper foil. The resulting panels exhibit both good adhesion and a high degree of uniformity of adhesion.

It has now been found that certain properties of copper-clad panels having plastic bases molded from a mixture of unsaturated polyester and methyl methacrylate can be improved by incorporating into the molding composition, prior to molding, a minor amount of certain organic epoxides. More particularly, it has been found that the incorporation in the molding composition of an epoxide of one of the types defined below provides a plastic base having substantially improved insulation resistance, as well as decreased brittleness and improved punchability. It is accordingly an object of the present invention to provide a copper-clad plastic panel with a plastic base having improved insulation resistance and decreased brittleness. It is another object of the invention to provide a copper-clad plastic panel having the known desirable electrical and mechanical properties of polyester/methyl methacrylate polymers and in addition having improved insulation resistance. It is still another object of the invention to provide a copper-clad panel having a plastic base composed predominately of polyester resin and which exhibits improved insulation resistance. Other objects of the invention will be in part obvious and in part pointed out hereafter.

Copper-clad plastic panels incorporating the present invention may be made in the general manner disclosed in U.S. Pat. 3,149,021 referred to above. Thus the panels are made by applying directly to the surface of a suitable copper foil a molding composition comprising a mixture op polymerizable constituents of the type described below and subjecting the molding composition and foil to heat and pressure to cause the components of the molding composition to polymerize in contact with the foil and adhere thereto.

In general, the molding composition comprises methyl methacrylate, an unsaturated polyester and the organic epoxide, and may also include various fillers and additives in accordance with known practice. The polyester is desirably used in such proportions that it comprises from 50% to 90% by weight of the mixture of polymerizable resins.

The organic epoxides that have been found useful in improving the insulation resistance of the molded base of the panel are epoxides having at least one epoxy group for every 950 units of molecular weight. They are further characterized by the fact that the epoxy group or groups thereof are free from tertiary carbon atoms, that is to say, neither carbon atom of the epoxy group is bonded to more than two other carbon atoms. Also in cases where the epoxide contains an aromatic ring structure the epoxy group or groups are separated by one or more carbon atoms from the aromatic structure. The epoxide is desirably used to the extent of 0.05% to 25% by weight, based on the total weight of polymerizable components in the composition.

The polyesters employed in the present molding composition may be made by condensation procedures known in the art, typical procedures being given in the specific examples set forth hereafter. In general, while an excess of either the glycol or acid ingredient can be used, it is desirable that approximately equi-molar proportions be employed. The glycols used in forming the polyester are preferably those containing no ether linkage, although it has been found that up to 50 by weight of glycol ethers may be used if desired. The glycols that can be used in forming the polyester include ethylene glycol and the several isomers of propylene, butylene, pentylene and hexylene glycol, as well as neopentyl glycol, hydroxypivalyl hydroxypivalate, 1,10-decanediol and unsaturated glycols, e.g., 2-butene-1,4-diol. In cases where the glycol used to form the polyester contains a minor amount of glycol having an ether linkage, the glycol ether may be, for example, a polyalkylene glycol, e.g., diethylene glycol, triethylene glycol, dipropylene glycol and the like, as well as relatively high molecular weight polyalkylene glycols. Also small amounts of hydroxy compounds containing more than two hydroxyl groups, e.g., trimethylol propane, can be incorporated in the reaction mixture if desired. Especially good results have been obtained by employing a polyester made from a mixture of glycols having 2 to 10 carbon atoms as disclosd in Soukup et al. application Ser. No. 568,751, now Pat. No. 3,477,900.

Among the alpha-unsaturated acids that can be used in preparing the polyesters to be used in forming the panels of the present invention are maleic, fumaric and itaconic acids and their anhydrides, as well as mixtures of such acids and anhydrides. The unsaturated acids may be mixed with a minor amount, say up to 25% by weight, of saturated acids without significant diminution in the adhesion of the copper foil to the molded panel. Typical saturated acids that may be used are adipic, succinic and phthalic acids and their anhydrides.

The invention is not limited to the addition of epoxides to polyesters made from the glycols and acids listed above. For example, commercially available polyesters such as the propoxylated bis-phenol/fumaric acid resins sold under the trade names Atlac 363E and Atlac 382E and the propylene glycol/maleic acid/phthalic acid polyester sold under the tradename Aropol 7200 MC can be used. Other polyesters of this type suitable for use as the polyester component of the present molding compositions are disclosed in U.S. Pats. 2,634,251 and 2,662,070.

In general, any organic expoxide wherein (a) there is at least one epoxide group for each 950 units of molecular weight, (b) the carbon atoms of the epoxy group or groups are connected to no more than two other carbon atoms and (c) the epoxy group or groups are separated by at least one carbon atom from any aromatic ring that may form part of the structure of the compound, can be used in carrying out the present invention. Typical epoxides that may be used in making the panels of the invention include epoxidized soy bean oil, epoxidized linseed oil, epoxidized polyolefin, epichlorohydrin/Bisphenol A epoxide resin, phenyl glycidyl ether, glycidyl methacrylate, vinyl cyclohexene dioxide, bis(3,4-epoxy-6-methylcyclohexylmethyl)adipate, 1,2 - epoxyindane, glycidyl acrylate (2,3-epoxypropyl arcylate), 1,2-epoxy-3-isopropoxypropane, 1-(p-tert.-butylphenoxy - 2,3-epoxypropane, tolyl glycidyl ether, butyl glycidyl ether, octylene oxide, allyl glycidyl ether, butadiene dioxide, diglycidyl ether, epoxidized trimethylol ethane- trioleate, epoxidized trimethylol propane trioleate and epoxidized 1,2,6-hexanetriol trioleate.

More generally, the epoxides to be used in carrying out the present invention can be selected from the those members of the classes defined in the following general formulas that have at least one epoxide group for each 950 units of molecular weight, and in respect to which the carbon atoms of the epoxy group or groups are connected to no more than two other carbon atoms and the epoxy group or groups are separated by at least one carbon atom from any aromatic ring that may form part of the structure of the compound:

(1)
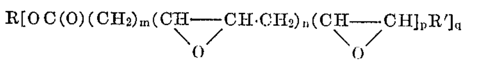

wherein R is selected from straight and branched chain hydrocarbons of 3 to 6 carbon atoms with 1 to 4 hydrogen atoms thereof replaced by ester groups of the structure within the brackets, R' is selected from hydrogen and alkyl groups, *m* is 0 to 8, *n* is 0 to 2, *p* is 0 to 1, *q* is 1 to 4 and *m* plus *n* and *p* plus *n* are each at least 1.

(2)
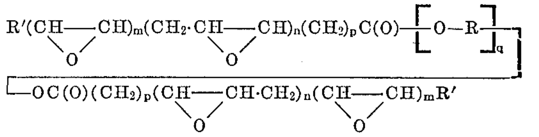

wherein R is an alkylene group of 2 to 4 carbon atoms, R' is an alkyl group, *m* is 0 to 1, n is 0 to 2, *p* is 0 to 8 and *q* is 1 to 6, *m* plus *n* being at least 1.

(3)
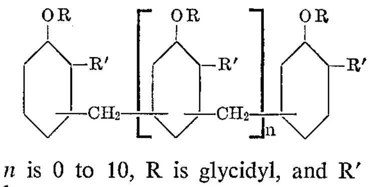

wherein *n* is 0 to 10, R is glycidyl, and R' is hydrogen or methyl.

The foregoing formula is intended to cover the commercial novalac-epoxy resins derived from phenol and cresol, i.e., phenolic and cresylic novalac-epoxy resins. Most of these commercial products contain a small proportion of "R" groups other than the glycidyl radical, i.e., $$HO\cdot CH_2\cdot CHOH\cdot CH_2ClCH_2\cdot CHOH\cdot CH_2—$$
$$HO\cdot CH_2\cdot CHOH\cdot CH_2OCH_2\cdot CHOH\cdot CH_2—$$

or hydrogen. It has been found that this small proportion of non-glycidyl radicals does not interfere with attainment of the objects of the present invention.

(4)
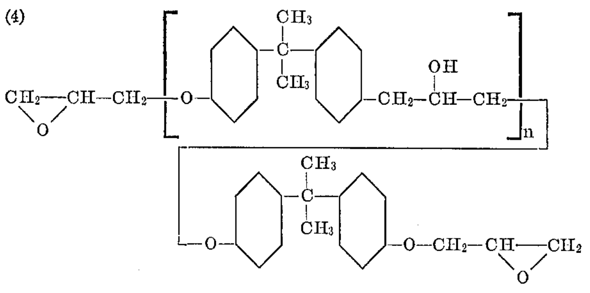

wherein *n* equals 0 to 15.

(5)
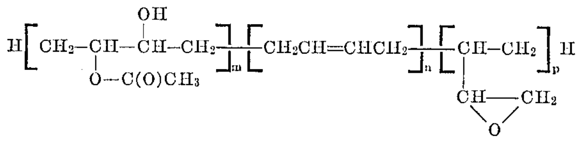

wherein *m* is 0 to 8, *n* is 0 to 8, *p* is 1 to 12 and *m* plus *n* plus *p* is 2 to 15.

In addition to the polymerizable components, a small amount of catalyst is desirably incorporated in the resin mixture prior to molding to accelerate the polymerization thereof. Any of the known methyl methacrylate polymerization catalysts such as benzoyl peroxide, lauroyl peroxide and tertiary butyl perbenzoate may be used. Also various additives and fillers may be incorporated in the mixture. For example, in the art of printed circuit manufacture it is customary to reinforce the resinous base of the panel with fibrous materials, e.g., glass or synthetic resin fibers in matted or woven fabric form, as well as non-woven cellulosic materials, e.g., paper. Also various subsidiary components are usually incorporated in the resinous base to provide a panel capable of meeting certain service requirements, including a number of requirements other than those mentioned above. For example, fillers such as calcium sulfate, aluminum silicate, clays, calcium carbonate, silica, calcium metasilicate, alumina and antimony oxide may be incorporated in the composition. Suitable fire retarding agents, such as chlorinated alkyl and aryl hydrocarbons may also be included. Typical fibrous reinforcements and subsidiary components useful in making the present panels are described in U.S. Pat. 3,149,021.

An illustrative procedure for making the panels of the invention may comprise the following steps: A piece of copper foil is carefully cleaned and a suitable reinforcing structure such as a layer of matted glass fibers or glass cloth is laid on the cleaned surface of the foil. The polymerizable resin mixture containing the catalyst and subsidiary components is then spread over the layer of glass fibers and flows into contact with the copper foil. The resulting composite structure is heated under pressure to form a polymeric reaction product of the methyl methacrylate, polyester and epoxides, and produce the molded base of the panel to which the copper foil firmly adheres. The resulting panel may be desirably subjected to a suitable post-cure treatment to ensure complete polymerization of the monomers and prepolymers from which the base is formed.

In order to point out more fully the nature of the present invention, the following specific examples are given of illustrative methods of carrying out the invention. In the examples the amounts of materials used are given in parts by weight unless otherwise indicated.

EXAMPLE 1

A polyester was prepared by reacting 116.1 parts of fumaric acid with 37.8 parts of 1,4-butanediol, 12.5 parts of 1,6-hexanediol, 16.7 parts of diethylene glycol and 28 parts of propylene glycol. 28 parts of the resulting polyester were heated to 130–150° F. and 12 parts of methyl methacrylate monomer added thereto. To this mixture 6.0 parts of chlorinated hydrocarbon (Dechlorane sold by Hooker Chemical Co.), 5.5 parts of antimony oxide, 19.5 parts of calcined aluminum silicate (Satintone No. 1) and 18.0 parts of calcium metasilicate (Cabolite P1) were added. The resulting composition was mixed thoroughly and allowed to cool to room temperature after which 0.5 part of benzoyl peroxide were mixed in thoroughly.

To a 450 gram portion of the filled molding resin as thus prepared, 50 grams of epoxidized soya oil having a molecular weight of 950 and an oxirane oxygen content of 7.1% were added. The mixture was stirred thoroughly and poured over a sheet of oxide treated copper foil measuring 18" x 18" x 0.0014". The layer of molding composition was covered with a sheet of fiber glass mat reinforcement 18" x 18" in size weighing 1¾ ounces per square foot of mat. The mat had a border of cotton yarn stapled thereto to serve as a gasket to confine the resin during the subsequent press molding operation. The yarn ran parallel to the sides of the mat about ½ inch inside the mat edges and was compressed to a thickness of about 0.040 inch during molding. The mat was covered with a sheet of parchment release paper and the assembly placed between metal plates for molding.

The assembly was molded by placing it in a press having platens heated to 235° F. and closing the press quickly to contact (within 60 seconds after inserting the assembly). The pressure was then increased gradually over a 60 to 90 second interval until a pressure of about 150 lbs./sq. in. on the composite was attained. This pressure with the accompanying heat was maintained for 10 minutes, after which the press was opened and the cured composite removed and allowed to cool to room temperature. In order to assure the attainment of maximum cure, the composite or laminate was post-cured by placing it in an oven at 300° F. for 12 hours.

The insulation resistance of the panel was measured after conditioning in a saturated steam atmosphere to accelerate the effects of aging in a high humidity environment. More particularly, the panel was maintained in an atmosphere of saturated steam at a pressure of about 10 lbs./sq. in. above atmospheric pressure for 30 minutes. The insulation resistance was measured in general accordance with ASTM Standards, Part 27, Method D-257. The test was carried out using an interlocking comb pattern test circuit prepared by silk screening onto the copper surface of the laminate the desired circuit with acid resistant ink and etching away the unwanted copper. The insulation resistance was measured at 500 volts D.C. using a megohm resistance meter. The insulation resistance of the panel prepared and conditioned as described above was 419 megohms. Its Barcol hardness was 41.

For purposes of comparison a control panel was made in the manner described above except that the 50 grams of epoxide was replaced with an additional 50 grams of the polyester resin. The control panel when conditioned and tested as described above, exhibited an insulation resistance of 37 megohms and a Barcol hardness of 63. Thus more than a 10-fold improvement in insulation resistance was achieved by addition of the epoxide to the molding composition.

EXAMPLE 2

A panel was prepared as described in Example 1 except that in place of the epoxidized soya oil, an epoxidized linseed oil having a molecular weight of 965 and an oxirane oxygen content of 9% by weight was used. The insulation resistance of the resulting panel when measured in the same manner as that of the panel in Example 1 was 1200 megohms. Its Barcol hardness was 49.

A series of panels was prepared according to the procedure of Example 1 except that various other epoxides were substituted for the epoxidized soya oil of Example 1. The nature of the epoxide used and the measured value of insulation resistance for each of these panels is given in Table I below.

TABLE I

| Ex. | Epoxide | Mol. wt. | Percent Oxirane oxygen | I.R., megohms |
|---|---|---|---|---|
| 3 | Epoxidized propylene glycol dioleate. | 635 | 5 | 85 |
| 4 | Epoxidized 2-ethyl hexyl oleate | 410 | 3.6 | 70 |
| 5 | Epoxidized 2-ethyl hexyl tallate | 415 | 4.5 | 160 |
| 6 | Epichlorohyrdin derivative of O-cresol-formaldehyde condensation product | 855 | 5 | 170 |
| 7 | Epichlorohydrin bisphenol-A condensation product | 375 | 8.0 | 3,300 |
| 8 | Epoxidized polybutadiene | 2,000 | 9.0 | 2,300 |
| 9 | Bis-(3,4-epoxy-6-methyl cyclohexyl methyl)adipate | 395 | 8.1 | 25,000 |
| 10 | Vinyl cyclohexene dioxide | 140 | 22.8 | 45,000 |
| 11 | Glycidyl methacrylate | 142 | 11.3 | 366 |

EXAMPLE 12

A panel was prepared in the manner described in Example 1 except that the 50 grams of epoxized soya oil of Example 1 was replaced by 25 grams of phenyl glycidyl ether and an additional 25 grams of the alkyd resin was used. The resulting panel had an insulation resistance of 1200 megohms and a Barcol hardness of 60.

EXAMPLE 13

A polyester was prepared by reacting 98.05 parts of maleic anhydride with 37.8 parts of 1,4-butanediol, 12.5 parts of 1,6-hexanediol, 36 parts of propylene glycol and 7.05 parts of trimethylol propane. A panel was made using 28 parts of this polyester in place of the polyester of Example 1 but otherwise following the procedure of Example 1. The insulation resistance of the resulting panel was 17,400 megohms and its Barcol hardness was 44.

Since a different polyester was used in preparing the panel of this example, a control panel was prepared wherein the procedure of example 1 was used except that the 50 grams of epoxidized soya oil was replaced by an additional 50 grams of the polyester of this example. The control panel exhibited an insulation resistance of 270 megohms and a Barcol hardness of 62. Thus the panel prepared with the epoxide exhibited an approximately 70-fold increase in insulation resistance.

EXAMPLE 14

A panel was prepared in accordance with the procedure of Example 1 except that the polyester of Example 13 was used and glycidyl methacrylate was used in place of epoxidized soya oil. The insulation resistance of the resulting panel was 125,000 megohms.

EXAMPLE 15

A panel was prepared according to the procedure of Example 14 except that the glycidyl methacrylate was replaced by epichlorohydrin bis-phenol-A condensation product. The insulation resistance of the resulting panel was 160,000 megohms, i.e., about 600 times the resistance of the control panel. The Barcol hardness of the panel of this example was 53.

EXAMPLE 16

The polyester used in preparing the panel of this example was a commercial polyester sold under the tradename Aropol 7200 MC and understood to be a condensation product of propylene glycol and a mixture of maleic and phthalic acids. A panel was made using this polyester in place of the polyester of Example 1. The insulation resistance of the resulting panel was 117 megohms and its Barcol hardness 44.

This insulation resistance is to be compared with that of a control sample made with the polyester of the present example by replacing the expoxidized soya oil with an equivalent amount of this polyester. The insulation resistance of the control panel was 18 megohms and its Barcol hardness 60. Thus the panel containing the epoxide exhibited an approximately 6-fold increase in insulation resistance.

EXAMPLE 17

A panel was made according to the procedure of Example 16 except that glycidyl methacrylate was used in place of the epoxidized soya oil. The insulation resistance of the resulting panel was 47 megohms.

EXAMPLE 18

The polyester used in the panel of this example was a commercial resin sold under the tradename Atlac 382E and understood to be propoxylated bis-phenol/fumaric acid resin. A panel was made in accordance with the procedure of Example 1 but using the Atlac 382E resin in place of the polyester of Example 1. The insulation resistance of the panel was 1400 megohms and its Barcol hardness 45.

A control panel made from the same molding composition except that the epoxidized soya oil was replaced by an equivalent weight of the Atlac 382E resin exhibited an insulation resistance of 240 megohms and had a Barcol hardness of 55. Thus the panel made from a composition containing the epoxide exhibited about a 6-fold increase in insulation resistance.

EXAMPLE 19

A panel was made in accordance with the procedure of Example 18 except that the epoxidized soya oil was replaced by glycidyl methacrylate. The panel had an insulation resistance of 1020 megohms.

EXAMPLE 20

The polyester of this example was a commercial grade of bisphenol modified polyester resin sold under the tradename Atlac 363E. A panel was made in accordance with the procedure of Example 1 except that the Atlac 363E resin was used in place of the polyester of Example 1. The panel had an insulation resistance of 1030 megohms and a Barcol hardness of 37.

A control panel made from a molding composition containing the Atlac 363E polyester and no epoxide exhibited an insulation resistance of 190 and a Barcol hardness of 54.

EXAMPLE 21

In order to show the effect of variations in the amount of epoxide in the molding composition a series of panels were prepared according to the procedure of Example 1 with varying quantities of the epoxidized soya oil being used. The results are given in Table II below wherein the quantity of epoxidized soya oil is given as a percentage of the total weight of the molding composition.

TABLE II

| Percent epoxide: | Insulation resistance |
|---|---|
| 10 | 1500 |
| 2 | 410 |
| 0.25 | 170 |
| 0.1 | 107 |
| 0.0 | 37 |

A series of panels was prepared according to the procedure of Example 1 except that the epoxidized soya oil of Example 1 was replaced by a phenolic or cresylic novolac-epoxy resin responding to general Formula 3 above and having an average *n* value of the order of 1.6 to 2. The nature of the epoxide used and the measured value of insulation resistance for each of these panels is given in Table III below.

TABLE III

| Example | Epoxide | Mol. wt. | Percent oxirane oxygen | I.R., megohms |
|---|---|---|---|---|
| 22 | Phenolic (DEN-438) | 580-640 | 9-10 | 7,200 |
| 23 | Phenolic (Epi-rez 5156) | 640+ | 8-9 | 1,070 |
| 24 | Cresylic (Kopox 737A) | 1,080 | 7-7.4 | 425 |
| 25 | Cresylic (Kopox 997A) | 1,270 | 6.6-7.0 | 192 |
| 26 | Cresylic (Kopox 995A) | 1,270 | 6.6-7.0 | 540 |

From the foregoing description it should be apparent that a consistently substantial improvement in insulation resistance of copper-clad plastic panels of the type described herein can be achieved by incorporating an epoxide of the type defined herein in the molding composition used to make the panel. It is of course to be understood that the foregoing examples are illustrative only and that numerous changes can be made in the ingredients, proportions and conditions mentioned therein without departing from the spirit of the invention as defined in the appended claims.

I claim:

1. A copper-clad plastic panel comprising a copper sheet having a plastic base molded thereto, the plastic of said base consisting essentially of a polymeric reaction product of three components, namely, (1) a minor amount of methyl methacrylate, (2) a major amount of an unsaturated polyester and (3) a minor amount of an organic epoxide having at least one epoxy group for every 950 units of molecular weight, neither carbon atom of said epoxy group being bonded to more than two other carbon atoms and the epoxy group or groups being separated by one or more carbon atoms from any aromatic ring structure present in said epoxide.

2. A copper-clad panel according to claim 1 and wherein the epoxide is of the general formula:

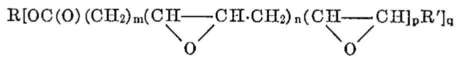

wherein R is selected from straight and branched chain hydrocarbons of 3 to 6 carbon atoms with 1 to 4 hydrogen atoms thereof replaced by ester groups of the structure within the brackets, R' is selected from hydrogen and alkyl groups, *m* is 0 to 8, *n* is 0 to 2, *p* is 0 to 1, *q* is 1 to 4 and *m* plus *n* and *p* plus *n* are each at least 1.

3. A copper-clad panel according to claim 1 and wherein the epoxide is of the general formula:

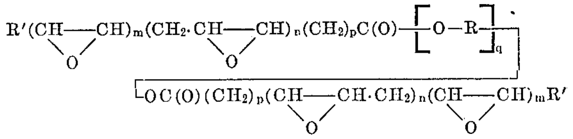

wherein R is an alkylene group of 2 to 4 carbon atoms, R′ is an alkyl group, *m* is 0 to 1, *n* is 0 to 2, *p* is 0 to 8 and *q* is 1 to 6, *m* plus *n* being at least 1.

4. A copper-clad panel according to claim 1 and wherein the epoxide is of the general formula:

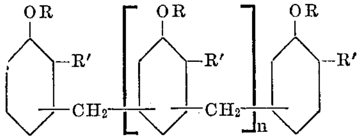

wherein *n* is 0 to 10, R is glycidyl and R′ is hydrogen or methyl.

5. A copper-clad panel according to claim 1 and wherein the epoxide is of the general formula:

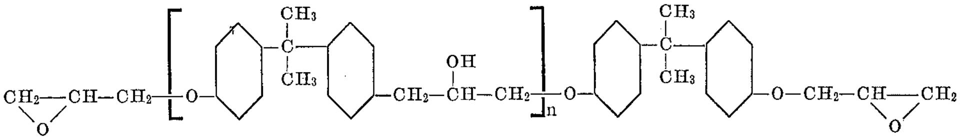

where *n* equals 0 to 15.

6. A copper-clad panel according to claim 1 and wherein the epoxide is of the general formula:

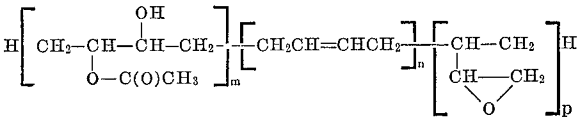

wherein *m* is 0 to 8, *n* is 0 to 8, *p* is 1 to 12 and *m* plus *n* plus *p* is 2 to 15.

7. A copper-clad panel according to claim 1 and wherein the epoxide is epoxidized soy bean oil.

8. A copper-clad panel according to claim 1 and wherein the epoxide is vinyl cyclohexene dioxide.

9. A copper-clad panel according to claim 1 and wherein the epoxide is bis(3,4-epoxy-6-methylcyclohexylmethyl)adipate.

10. A copper-clad panel according to claim 1 and wherein the epoxide is epichlorohydrin/Bisphenol A epoxide resin.

11. A copper-clad panel according to claim 1 and wherein the epoxide is epoxidized polyolefin.

12. A copper-clad panel according to claim 1 and wherein said polyester is a propoxylated bis-phenol/fumaric acid resin.

13. A copper-clad panel according to claim 1 and wherein said polyester is an ethoxylated bis-phenol/fumaric acid resin.

14. A copper-clad plastic panel comprising a copper sheet having a plastic base molded thereto, the plastic of said base consisting essentially of a polymeric reaction product of three components, namely, (1) methyl methacrylate, (2) from 50% to 90% by weight, based on the total weight of said three components, of a polyester which is the condensation product of one or more dicarboxylic acids and one or more glycols, at least 75% by weight of the said acid component of said polyester having an olefinic bond in a position alpha to one of the two carboxyl groups thereof, and (3) from 0.05% to 25% by weight, based on the weight of said three components, of an organic epoxide having at least one epoxy group for every 950 units of molecular weight, neither carbon atom of said epoxy group being bonded to more than two other carbon atoms and the epoxy group or groups being separated by one or more carbon atoms from any aromatic ring structure present in said epoxide.

15. A copper-clad panel according to claim 14 and wherein said polyester component is formed from one or more alpha-unsaturated acids and a mixture of two or more glycols having 2 to 10 carbon atoms, said glycol mixture containing no more than 50% by weight of glycols having an ether linkage therein.

16. A copper-clad panel according to claim 14 and wherein said epoxide is a phenolic novolac epoxy resin.

17. A copper-clad panel according to claim 14 and wherein said epoxide is a cresylic novolac epoxy resin.

References Cited

UNITED STATES PATENTS

| | | | |
|---|---|---|---|
| 2,691,004 | 10/1954 | Doyle | 161—186X |
| 2,883,308 | 4/1959 | Yamada et al. | 174—110X |
| 3,011,909 | 12/1961 | Hart et al. II | 161—186X |
| 3,048,552 | 8/1962 | Fang | 260—28.5 |
| 3,149,021 | 9/1964 | Goepfert et al. | 161—214 |
| 3,156,580 | 11/1964 | Howard | 117—75 |
| 3,216,848 | 11/1965 | Hart et al. I | 161—186X |
| 3,393,117 | 7/1968 | Zolg et al. | 161—93X |
| 3,230,163 | 1/1966 | Dreyfus | 204—281 |
| 3,477,900 | 11/1969 | Soukup et al. | 161—231X |
| 3,488,249 | 1/1970 | Wolinski | 161—185 |

HAROLD ANSHER, Primary Examiner

U.S. Cl. X.R.

156—330, 332; 161—214, 218; 174—68.5, 110; 260—871